United States Patent
Yamamoto et al.

(10) Patent No.: US 6,343,068 B1
(45) Date of Patent: Jan. 29, 2002

(54) GUARD APPARATUS FOR AVOIDING MALFUNCTION IN OPTICAL COMMUNICATION SYSTEM

(75) Inventors: Chiyoko Yamamoto; Masahiro Shioda, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/154,495

(22) Filed: Sep. 16, 1998

(30) Foreign Application Priority Data

Feb. 12, 1998 (JP) .......................................... 10-029432

(51) Int. Cl.⁷ ........................... H04J 1/16; H04L 12/26; H04L 27/30; H04K 1/00; H04B 10/08
(52) U.S. Cl. ....................... 370/242; 370/219; 370/222; 370/227; 370/252; 375/202; 375/222; 359/110; 359/124; 359/133
(58) Field of Search ............................... 370/242, 245, 370/249, 248, 222, 216, 223, 224, 219, 220, 227, 226, 252; 704/5.1, 5.5; 375/202, 222; 359/110, 124, 133

(56) References Cited

U.S. PATENT DOCUMENTS

| | | | |
|---|---|---|---|
| 5,532,862 A | * 7/1996 | Tada et al. | 359/161 |
| 5,568,486 A | * 10/1996 | Huscroft et al. | 359/110 |
| 5,717,796 A | * 2/1998 | Clendening | 385/24 |
| 5,740,157 A | * 4/1998 | Demiray et al. | 370/219 |
| 5,745,476 A | * 4/1998 | Chaudhuri | 370/222 |
| 5,764,651 A | * 6/1998 | Bulock et al. | 371/5.5 |
| 6,115,157 A | * 9/2000 | Barnard et al. | 359/124 |
| 6,141,320 A | * 10/2000 | Ikawa | 370/227 |
| 6,144,633 A | * 11/2000 | Ikeda et al. | 370/217 |

FOREIGN PATENT DOCUMENTS

JP 7273737 10/1995

OTHER PUBLICATIONS

Synchronous Optical Network (SONET) Transport Systems: Common Generic Criteria; 3.3.2 STS–1 Overhead Descriptions; 3.3.2.1 Section Overhead; 3.3.2.2. Line Overhead (pp. 3–27–3–31) Table 5–3, 5–4, pp. 5–27–5–28); R5–68, R5–69 (pp. 5–32).

* cited by examiner

Primary Examiner—Wellington Chin
Assistant Examiner—M. Phan
(74) Attorney, Agent, or Firm—Rosenman & Colin LLP

(57) ABSTRACT

The present invention relates to a guard apparatus for avoiding the malfunction of a communication apparatus due to an error in the received data in the specific location of a frame on the receiving side of an optical communication system using a SONET/SDH network. If a B2 error, a frame pattern error or an out-of-frame is detected for a received frame, this guard apparatus stops the operation for tri-stage protection for the data of the K1 and K2 bytes, and outputs data outputted for a received frame received one frame before the above-mentioned received frame. If these errors are not detected, the guard apparatus selects and outputs the non-protected data of the K1 and K2 bytes in the above-mentioned received frame. Thus, the extraction of data with an error due to an optical degradation can be avoided and thereby the malfunction of a communication apparatus in an optical communication system can be avoided.

17 Claims, 13 Drawing Sheets

GUARD APPARATUS FOR AVOIDING MALFUNCTION IN OPTICAL COMMUNICATION SYSTEM

BACKGROUND OF THE INVENTION

1. Field of the Invention

The present invention relates to a malfunction avoiding guard apparatus for avoiding the malfunctions of a communication apparatus due to an error in the received data in the specific location of a frame in an optical communication system, in particular, a SONET/SDH optical communication apparatus.

2. Description of the Related Art

In a SONET (Synchronous Optical Network)/SDH (Synchronous Digital Hierarchy) optical communication apparatus, for example, the K1 and K2 bytes of the line overhead unit of a SONET frame are assigned to automatic protection switching (APS) signals between line termination devices, and on the receiving side of the frame the communication apparatus is controlled according to the contents extracted from these bytes.

Since when the contents of the K1 and K2 bytes are changed due to an optical degradation in the communication system, there is a possibility that the communication apparatus malfunctions, and conventionally, in order to avoid this malfunction, data are considered to be correct, and are extracted, only if the data of the K1 and K2 bytes are the same in three consecutive frames.

In this conventional way, even when there is an error in data due to an optical degradation, the data are considered to be correct and are extracted, as long as the same data are received in three consecutive frames. Thus, conventionally there is a problem that this causes malfunctions of the communication apparatus.

SUMMARY OF THE INVENTION

It is an object of the present invention to prevent erroneous data caused by an optical degradation from being extracted, which is a cause of the malfunctions of a communication apparatus, by changing a protection method depending on whether or not an error predetermined for a receiving frame is detected and to reinforce the guard for the error to be stronger than ever when the error is detected.

The guard apparatus of the present invention for avoiding the malfunctions of a communication apparatus due to an error in the received data on the receiving side of an optical communication system comprises a tri-stage protection unit and a selector unit.

If the data in the predetermined location of the received frame and the data in the above-mentioned predetermined location of the received frames received one and two frames before the above-mentioned frame are all the same, the tri-stage protection unit outputs the data, while if not, or if an INH signal is inputted, the tri-stage protection unit outputs the data outputted for a received frame received one frame before the above-mentioned frame.

If an error detection signal predetermined for the above-mentioned received frame is inputted, the selector unit outputs the above-mentioned INH signal to the above-mentioned tri-stage protection unit and selects the output of the tri-stage protection unit, while if not, the selector unit selects and outputs the data in the predetermined location of the above-mentioned received frame.

In the present invention, the guard for avoiding malfunctions can also be reinforced by further providing a second tri-stage protection unit. If the output data outputted by the selector unit and two output data outputted by the above-mentioned selector unit one and two data before the above-mentioned output data are all the same, the second tri-stage protection unit outputs the above-mentioned data. While if not, the tri-stage protection unit outputs the data outputted by the selecting unit one data before the above-mentioned output data.

Moreover, in the present invention, for example, an error condition setting unit for providing the selector unit with a pseudo-error detection signal according to an instruction from a computer and an error detection signal nullification unit for nullifying an error detection signal inputted in the selector unit and enabling the selector unit to select data in a receiving frame can also be provided.

According to the present invention, a protection method is changed depending on whether or not an error predetermined for a receiving frame is detected. Thus, the extraction of erroneous data due to an optical degradation being a cause of the malfunctions of a communication apparatus can be avoided.

DESCRIPTION OF THE PREFERRED EMBODIMENTS

Figure 1:
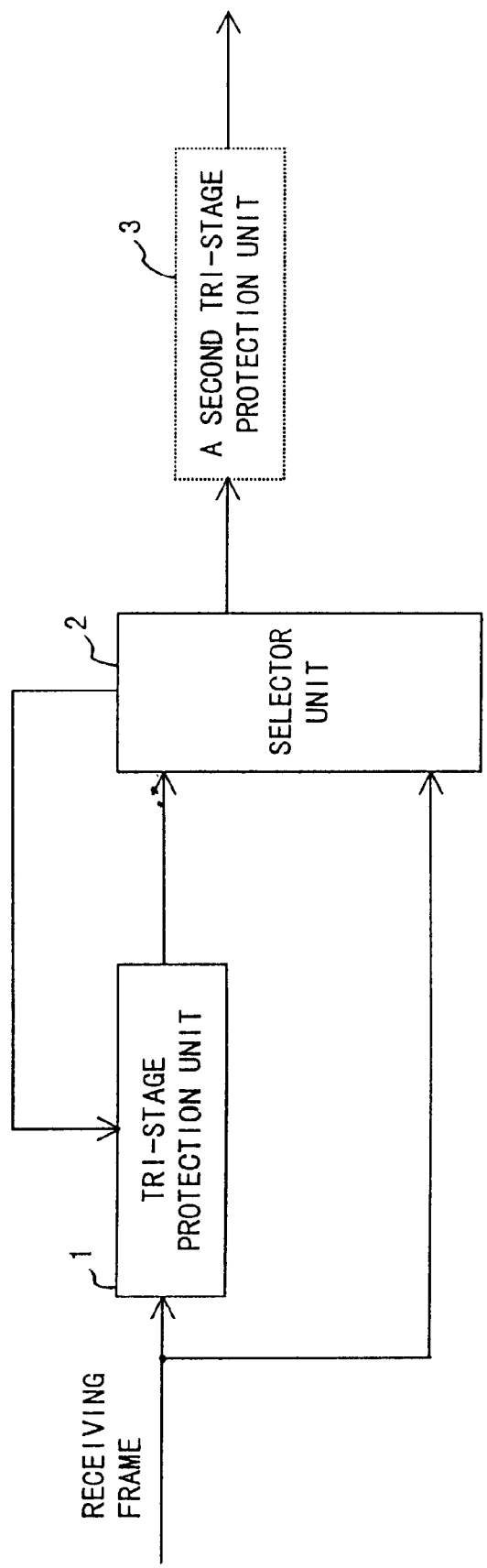
FIG. 1 shows the principle configuration of the embodiment of the present invention.

FIG. 1 shows the principle configuration of the embodiment of the present invention. FIG. 1 shows the principle configuration of a guard apparatus for avoiding the malfunctions of a communication apparatus due to an error in the received data on the receiving side of, for example, a SONET/SDH optical communication system.

In FIG. 1, if the same data are received in the predetermined location in three consecutively received frames, for example, the data in the K1 and K2 bytes, the tri-stage protection unit 1 outputs these same data, while, if not, the tri-stage protection unit 1 outputs the same data as the data outputted immediately before.

If a detection signal for an error predetermined for a receiving frame, for example, a B2 byte error in a SONET frame, is inputted, the selector unit 2 stops the operation of the tri-stage protection by the tri-stage protection unit 1, and selects the same output as before the stop of the operation of the tri-stage protection unit 1, while, if not, the selector unit 2 selects and outputs the data in the receiving frame as they are.

In this embodiment, data are extracted, for example, using as a target the K1 and K2 bytes in the overhead section of a SONET frame, that is, an automatic protection switching signal.

A detection signal for a predetermined error inputted to the selector unit 2 is a signal for indicating that one of a B2 byte error in the overhead section of a SONET frame, a frame pattern error for a SONET frame and an out-of-frame in the case where a frame pattern error occurs in five consecutive frames, is detected.

In this embodiment, a still stronger guard for avoiding malfunctions can also be realized by further providing a second tri-stage protection unit 3 for performing the same operation as the tri-stage protection unit 1, inserted after the selector unit 2 as shown in FIG. 1.

In this embodiment, the operation of the guard apparatus for avoiding malfunctions including the tri-stage protection unit 1 shown in FIG. 1 can also be verified, for example, by further providing an error condition setting unit for providing the selector unit 2 with a pseudo-error detection signal according to an instruction from a computer, or by further providing an error detection signal nullification unit for forcing the selector unit 2 to select the data in a receiving frame as they are, even when a detection signal for a predetermined error is inputted.

Figure 2:
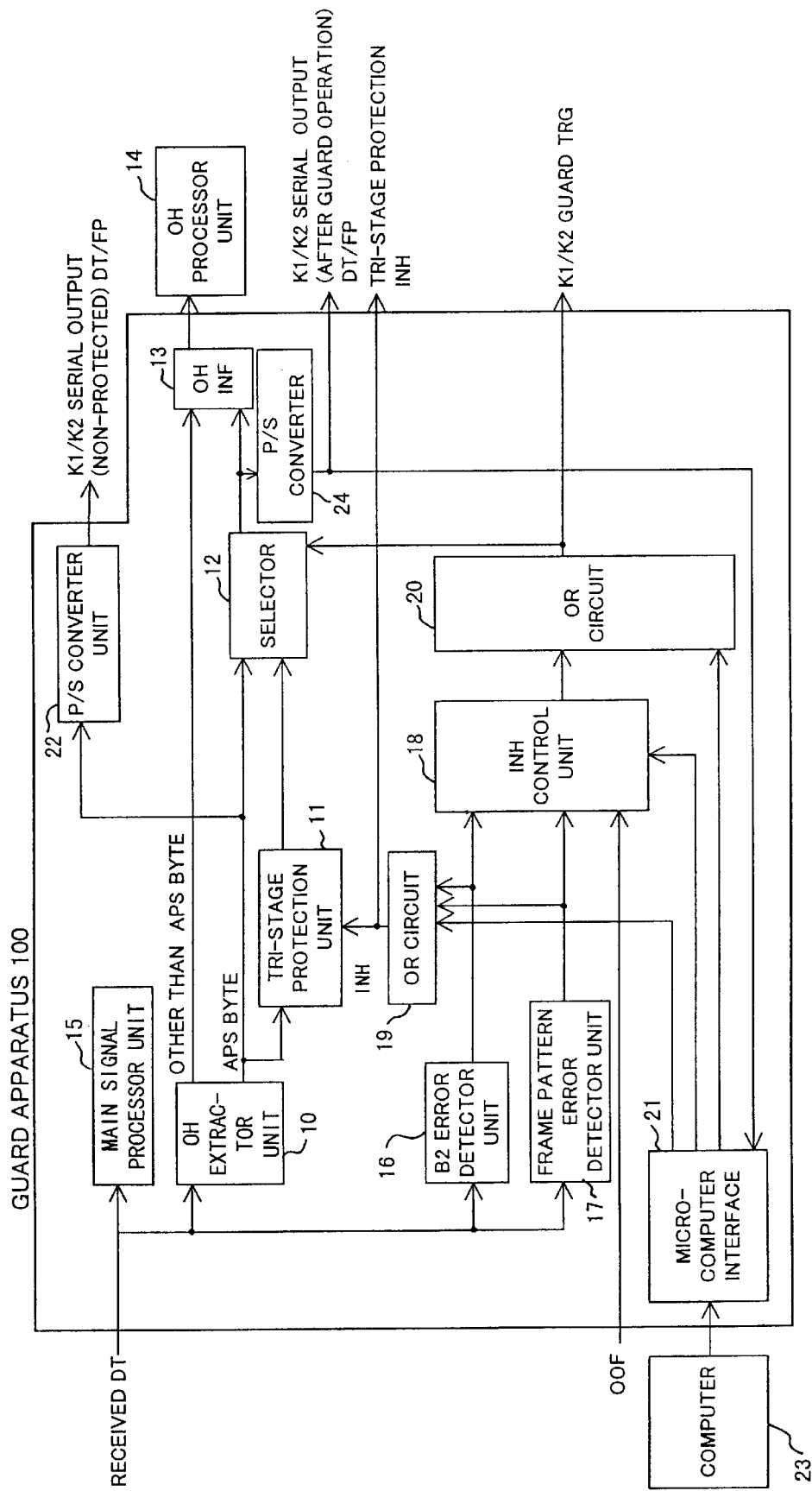
FIG. 2 shows the configuration of one embodiment of the guard apparatus of the present invention for avoiding the malfunctions.

FIG. 2 shows the configuration of the embodiment of the guard apparatus of the present invention for avoiding malfunctions in an optical communication system. The major part of the guard apparatus 100 shown in FIG. 2 for avoiding the malfunctions of a communication apparatus due to an error in received data comprises an overhead (OH) extractor unit 10, a tri-stage protection unit 11, a selector 12 and an overhead interface (OH INF) 13.

The overhead extractor unit 10, for example, extracts the overhead section of a SONET/SDH frame from received data (DT), and other section of the frame are provided to a main signal processor unit 15.

The tri-stage protection unit 11 receives the data input of the automatic protection switching (APS) bytes, that is, the K1 and K2 bytes. If the data of the K1 and K2 bytes in three consecutive frames are the same, the tri-stage protection unit 11 outputs the same data, while if not, the tri-stage protection unit 11 outputs the data of three consecutive coincident frames immediately before the received frame.

The selector 12 selects and outputs either APS bytes extracted by the overhead extractor unit 10, that is, non-protected data, or the output of the tri-stage protection unit 11. The overhead interface 13 receives both the output of the selector 12 and the data of the overhead section other than the APS bytes outputted by the overhead extractor unit, and outputs these data to an OH processor unit 14.

This OH processor unit 14 is provided with a tri-stage protection unit for executing the same tri-stage protection process as the tri-stage protection unit 11. If the data of the inputted K1 and K2 bytes are the same in three consecutive frames, the OH processor unit 14 outputs the same data, while if not, the OH processor unit 14 outputs the data against a frame immediately preceding the received frame. In this embodiment, both the tri-stage protection conventionally performed by the OH processor unit 14 and a tri-stage protection by a guard apparatus 100 are performed on the receiving apparatus side of an optical communications system.

A parallel/serial (P/S) converter unit 22 located at the top of FIG. 2 converts the signals of APS bytes outputted by the overhead extractor unit 10 to serial signals, and outputs the non-protected data (data DT and frame pattern FP) as K1 and K2 serial signals, which are used for the verification of the circuit operation and debugging as described later.

A B2 error detector unit 16, a frame pattern error detector unit 17, an INH (inhibit) control unit 18, two OR circuits 19 and 20, and a microcomputer interface 21 at the bottom of FIG. 2 control the stopping of the tri-stage protection operation by the tri-stage protection unit 11 and the selection of the selector 12.

The B2 error detector unit 16 detects errors in the B2 bytes of the overhead section of a SONET/SDH frame. The frame pattern error detector unit 17 detects frame pattern errors from the data of the A1 and A2 bytes at the head of the SONET/SDH frame.

A B2 error detected by the B2 error detector unit 16 is an error able to be detected from the B2 bytes for indicating whether or not there is an error in the APS bytes. If an error of $10_{-3}$, that is, an error at the rate of 1 or more in 1,000 bits is detected, the B2 error detector unit 16 judges this to be a B2 error. A fixed pattern is set for the A1 and A2 bytes of a transmitting frame, and if this fixed pattern cannot be detected from the A1 and A2 bytes of the transmitting frame, the frame pattern error detector unit 17 judges this to be a frame pattern error.

Figure 3:
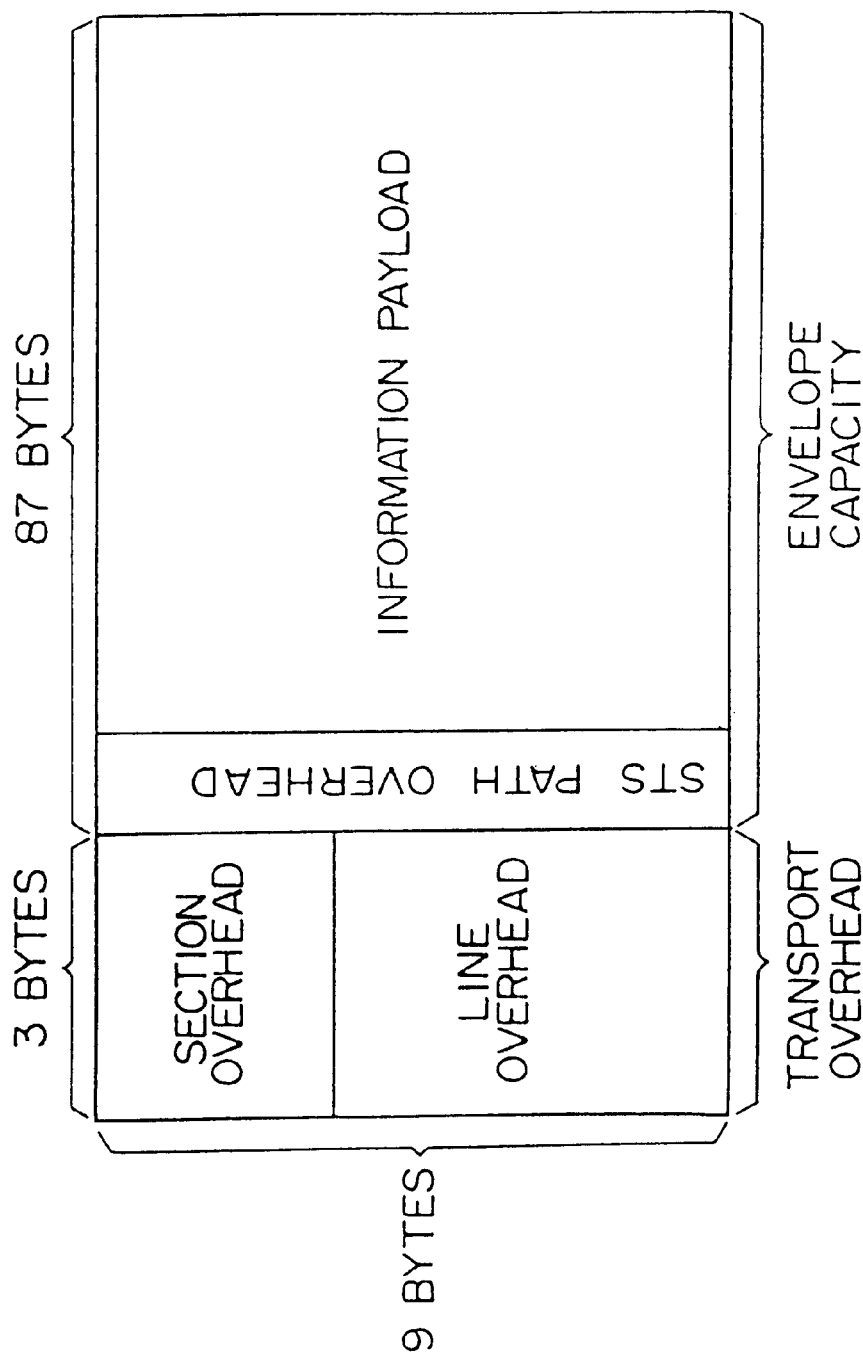
FIG. 3 shows the format of a SONET/SDH frame.

Next, the format of a SONET/SDH frame and the configuration of the overhead section are described below with reference to FIGS. 3 and 4. FIG. 3 shows the format of a SONET/SDH frame. In FIG. 3, in the head of the SONET/SDH frame both a section overhead and a line overhead are stored as a transport overhead, and after that both a path overhead and an information payload are stored as an envelope capacity.

Figure 4:
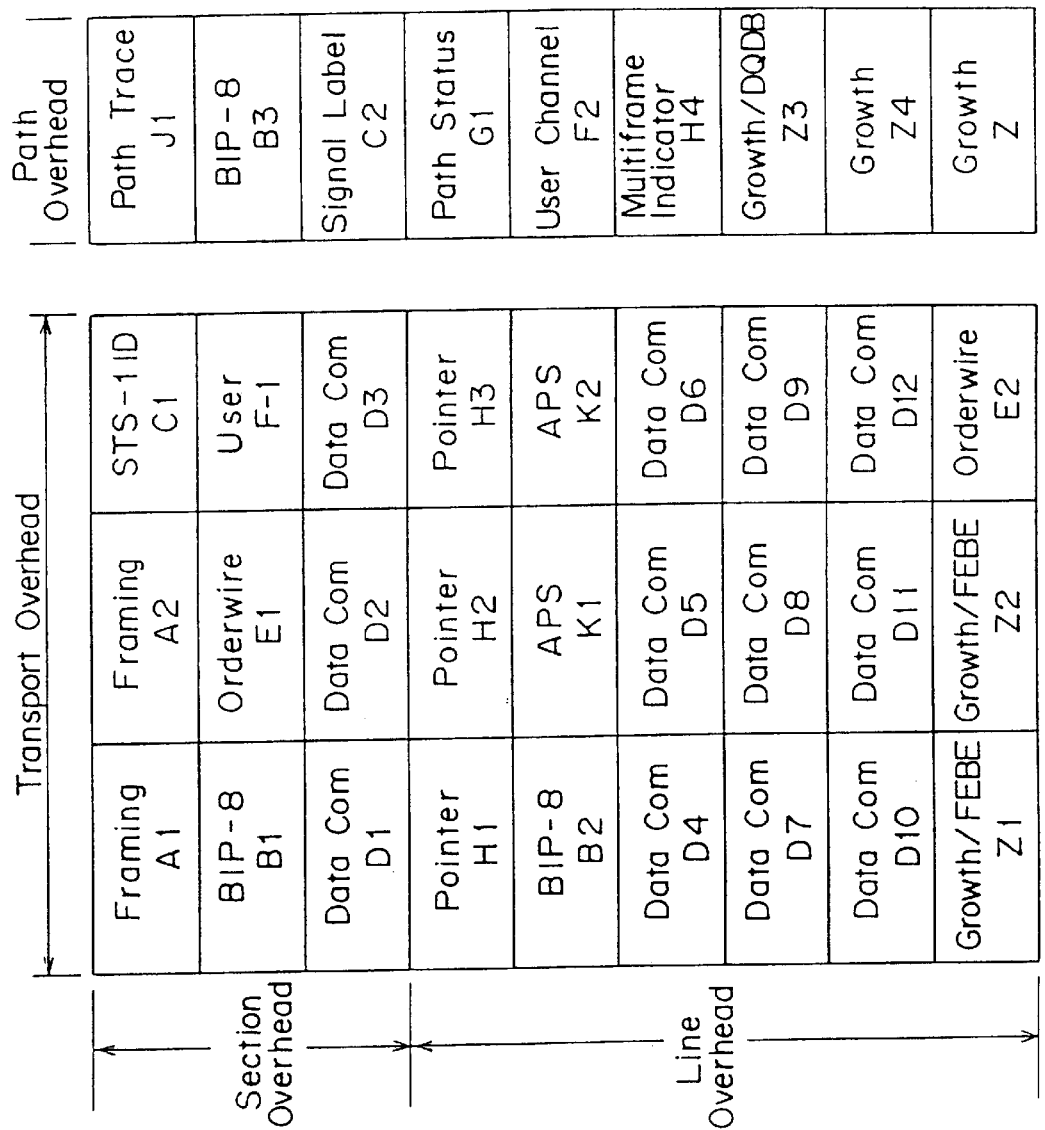
FIG. 4 shows the byte structure of the overhead section of a SONET/SDH frame.

FIG. 4 explains the location of each byte in the transport overhead and the path overhead shown in FIG. 3. In FIG. 4, the A1 and A2 bytes for detecting a frame pattern are located at the head of the section overhead of the transport overhead, and a predetermined value (F628H) is stored there. Both B2 bytes for detecting a B2 error, and K1 and K2 bytes being a target of a guard operation in this embodiment, are stored as a part of the line overhead in the transport overhead.

The frame pattern error detector unit 17 monitors the 32 bits of data in the A1 and A2 bytes, and if the data are values other than the predetermined value, the frame error detector unit 17 judges this to be a frame error. If an error of $10^{-3}$, that is, an error at the rate of 1 or more in 1,000 bits, due to an optical degradation, is detected depending on the contents of the received B2 bytes, the B2 error detector unit 16 judges this to be a B2 error.

In FIG. 2, the detection results of the B2 error detector unit 16 and the frame pattern error detector unit 17, and the detection result of an out-of-frame by an out-of-frame (OOF) detector unit, not shown in the diagram, are provided to the tri-stage protection unit 11 through the OR circuit 19 as a tri-stage protection INH signal. This tri-stage protection INH signal stops the operation for tri-stage protection of the tri-stage protection unit 11. Each flip-flop composing the tri-stage protection unit 11 is cleared by this signal, as described later, the tri-stage protection unit 11 maintains the output before the clearing step as it is, and continues to output this output to the selector 12 side. An OOF is an error indicating that a frame pattern error occurs in five consecutive frames. Although in FIG. 2 the frame pattern error detector unit 17 is configured to be independent of the OOF detector unit, the frame pattern error detector unit 17 can also be included in the OOF detector unit, since the frame pattern error is a part of the OOF.

The error detection results of the B2 error detector unit 16 and the frame pattern error detector unit 17 and the OOF detection result are also provided to the INH control unit 18, and are used for the selection control of the selector 12 through the OR circuit 20. If one or more of these three kinds of errors occur simultaneously, the selector 12 selects the output of the tri-stage protection unit 11, and outputs this output to the overhead interface 13. If none of these three errors occurs, the selector 12 selects APS bytes extracted by the overhead extractor unit 10, that is, non-protected data as they are, and outputs the non-protected data to the overhead interface 13.

A microcomputer interface 21 connects a computer 23 of a micro-controller, etc. and the guard apparatus 100.

The microcomputer interface 21 falsely outputs error detection signals for the verification of the circuit operations, debugging, etc. according to instructions from the computer 23, and conversely enables circuits to nullify the error detection, even if an error is actually detected. When a pseudo-error detection signal is issued from the microcomputer interface 21, the signal stops the operation for tri-stage protection of the tri-stage protection unit 11 through the OR circuit 19, and simultaneously enables the selector 12 to select the output of the tri-stage protection unit 11 through the OR circuit 20 using another route. Even if the error detection result of the B2 error detector unit 16 is inputted to the INH control unit 18, the signal inputted from the microcomputer interface 21 to the INH control unit 18 enables the INH control unit 18 to nullify the detection result, selects the non-protected data (APS bytes) and outputs the data to the selector 12 through the OR circuit 20.

K1 and K2 serial outputs (after the guard operation) on the right side of FIG. 2, that is, the output (DT and FP) obtained by parallel/serial-converting the output of the selector 12 by a parallel/serial- converter 24, a tri-stage protection INH signal being the output of the OR circuit 19, and the output of the OR circuit 20, that is, K1 and K2 guard TRG signal being selection control signal to the selector 12, are all used for the verification of circuit operations and debugging.

Figure 5:
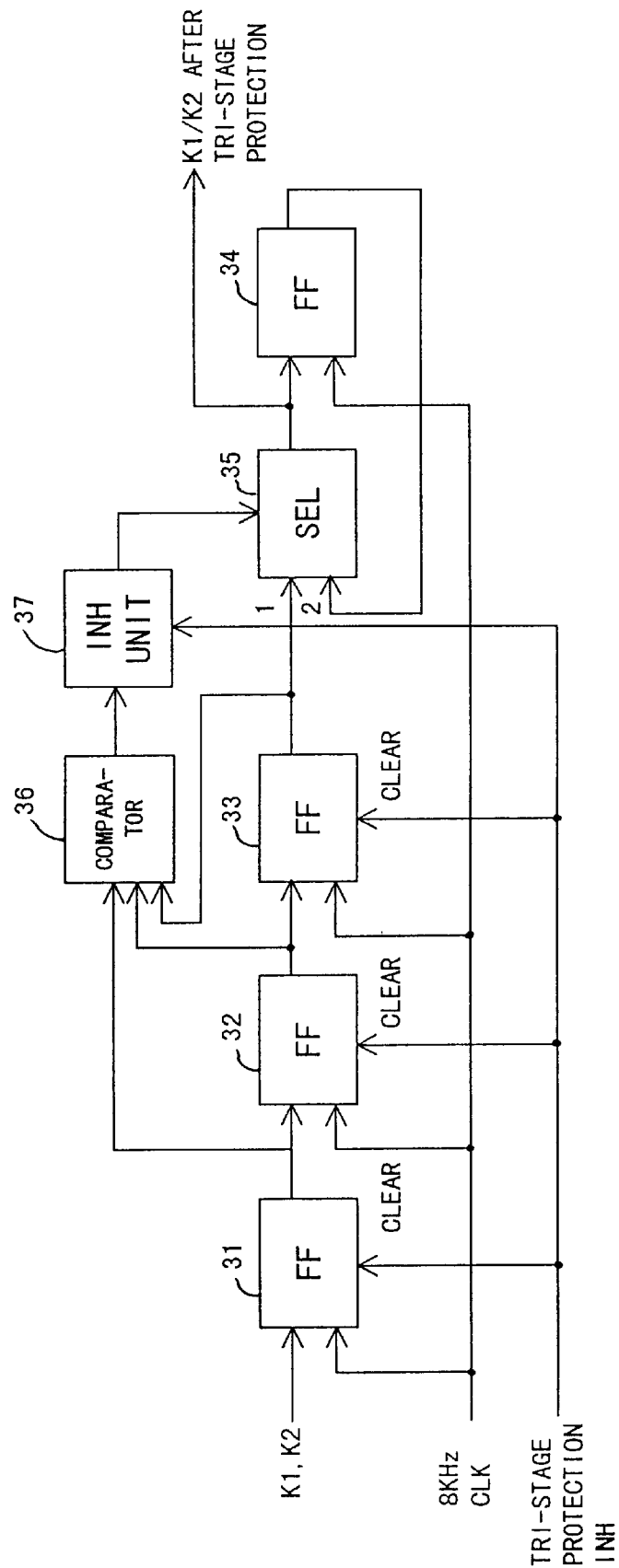
FIG. 5 shows the detailed configuration of a tri-stage protection unit.

FIG. 5 shows the detailed configuration of the tri-stage protection unit shown in FIG. 2. The tri-stage protection unit 11 shown in FIG. 5 comprises four flip-flops FF 31 through 34, a selector (SEL) 35 for selecting either of the outputs of FF 33 or FF 34 and outputting the output as a tri-stage protection result, a comparator 36 for comparing the outputs of FF 31, FF 32 and FF 33, and an INH unit 37 for nullifying the comparison result of the comparator 36 when a tri-stage protection INH signal, that is, a signal for stopping the operations for the tri-stage protection of the tri-stage protection unit 11 is inputted, and enabling the selector 35 to select the output of FF 34.

If a tri-stage protection INH signal is inputted, the comparison result of the comparator 36 is nullified, and the data of the three FFs 31 through 33 are cleared. If there is no tri-stage protection INH signal, the comparison result of the comparator 36 become valid. If as a result of the comparison the above-mentioned three data of three FFs 31 through 33 are the same, the selector 35 selects the output of FF 33 and provides the output to FF 34, and simultaneously outputs this output as a tri-stage protection result.

Figure 6:
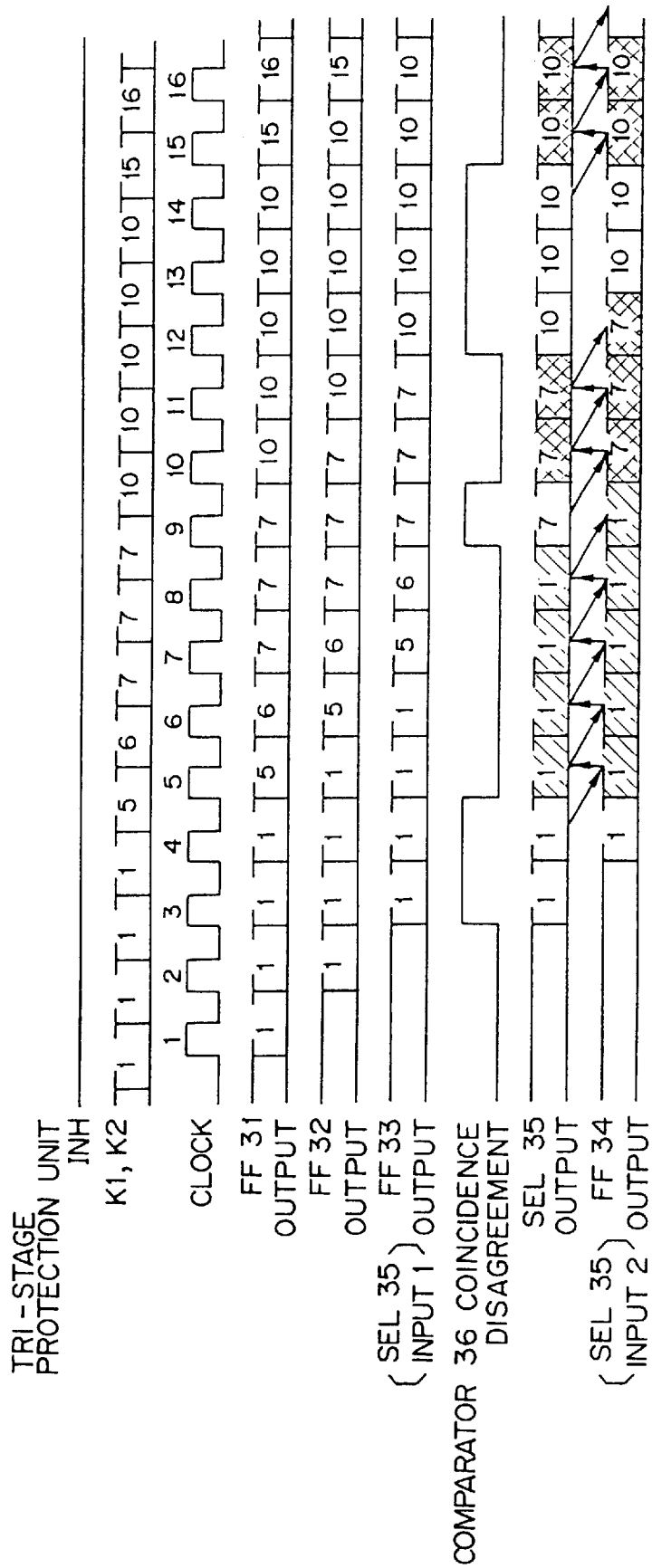
FIG. 6 explains an operation example of a tri-stage protection unit in the case where a tri-stage protection INH signal is not inputted.
Figure 7:
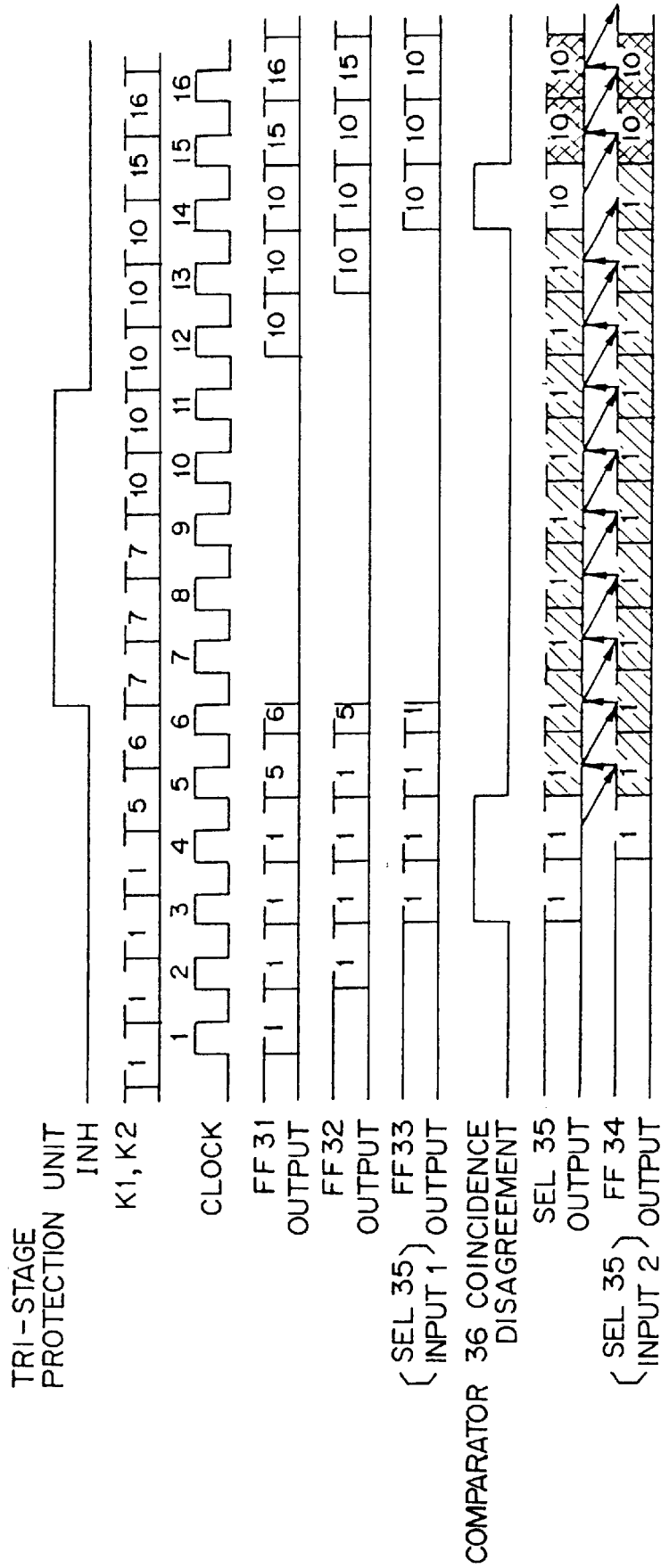
FIG. 7 explains an operation example of a tri-stage protection unit in the case where a tri-stage protection INH signal is inputted.

FIGS. 6 and 7 explain operation examples of the tri-stage protection unit.

FIG. 6 explains an operation example of the tri-stage protection unit 11 in the case where a tri-stage protection INH signal is not inputted to the tri-stage protection unit 11. In FIG. 6, the input in the case of clocks 1 through 4, that is, the data of the K1 and K2 bytes in three consecutive frames, are all data 1, and thereby in the case of a clock 3, the outputs of FF 31, FF 32 and FF 33 all become data 1. Thus, the comparator 36 outputs a signal for indicating that all the outputs of FF 31, FF 32 and FF 34 coincide to the selector 35, through the INH unit 37. By this signal from the comparator 36 the selector 35 selects and outputs data 1 inputted from FF 33 as a tri-stage protection result. This output of the selector 35 is also inputted and latched to FF 34.

In the case of a clock 4, since all the outputs of FF 31, FF 32 and FF 33 coincide, like the case of clock 3, data 1 being the output of FF 33 is selected and outputted as the output of the tri-stage protection unit 11.

In the case of a clock 5, the data of the K1 and K2 bytes become data 5, and the value of the data is different from the values of the data of the K1 and K2 bytes of frames one and two frames before. Thus, in the case of a clock 5, the comparator 36 outputs a signal for indicating a disagreement among the data of the K1 and K2 bytes of three consecutive frames, and as a result, the selector 35 selects and outputs the output of FF 34, that is, data 1 being the data of the K1 and K2 bytes in the case of a clock 4. This output of the selector 35 is inputted and latched to FF 34. After this, in the case of clocks 6 through 8 where the values of the K1 and K2 of three consecutive frames are not the same data, the same operation is performed, data 1 being the output of FF 34 continues to be outputted as a tri-stage protection result.

In the case of a clock 9, the data of the K1 and K2 bytes of three consecutive frames all become data 7, and the comparator 36 outputs a signal indicating this coincidence to the selector 35 through the INH unit 37. Thus, the selector 35 selects and outputs data 7 being the output of FF 33. This output of the selector 35 is also latched to FF 34.

In the case of a clock 10, the data of the K1 and K2 bytes become data 10, and the values are different from the values of the data of the K1 and K2 bytes of frames one and two frames before. Thus, the comparator 36 outputs a signal indicating a disagreement of data, and thereby the selector 35 selects and outputs data 7 being the output of FF 34 as a tri-stage protection result. After this, by the same operation as that in the case of clock 11, the output data of the tri-stage protection result becomes data 7, and in the case of clocks 12 and after, the output data of the tri-stage protection result become data 10.

FIG. 7 explains an operation example of the tri-stage protection unit 11 in the case where, as in the case of clocks 7 through 11, a tri-stage protection INH signal for stopping the operation for tri-stage protection of the tri-stage protection unit 11 is inputted. The operations in the case of clocks 1 through 6 shown in FIG. 7 are the same as those shown in FIG. 6.

When a tri-stage protection INH signal is inputted before the term of a clock 7, the comparison result of the comparator 36 is nullified, while an INH signal is inputted in the case of clocks 7 and after (clocks 7 through 11 shown in FIG. 7). The selector 35 always selects and outputs the output of FF 34, that is, continues to output data 1 being the output in the case of a clock 6.

The data of three FFs 31 through 33 are all cleared by the input of an INH signal. As a result, if in the case of a clock 12 there is no input of an INH signal and the tri-stage protection unit 11 restarts the operation, the outputs of FFs 31 through 33 do not coincide immediately, and thereby the selector 36 continues to output data 1 until a clock 13 is inputted. If in the case of a clock 14 the comparator 36 detects the coincidence of the data of FFs 31 through 33, the selector 35 outputs data 10 being data from FF 33, and after that, performs the same operations as those shown in FIG. 6.

Figure 8:
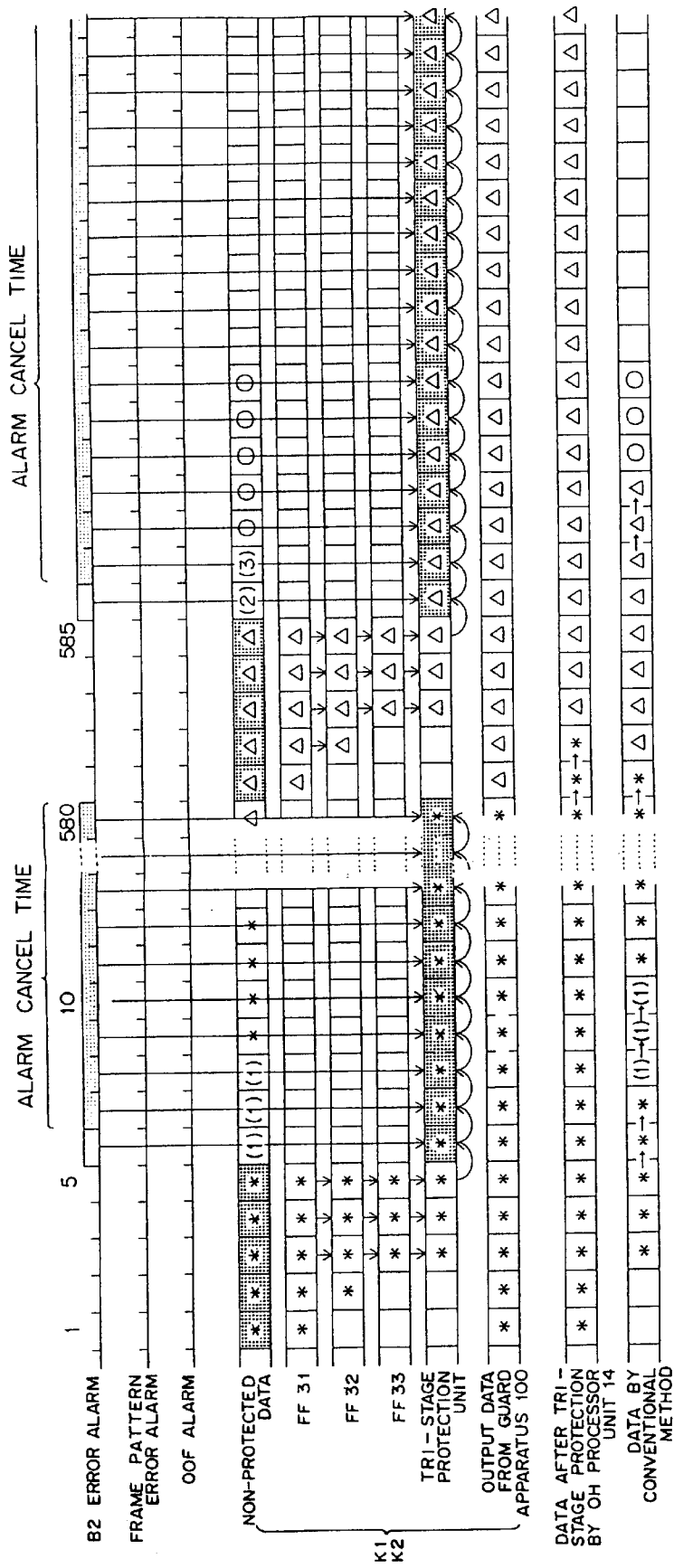
FIG. 8 explains an operation example of a guard apparatus for avoiding malfunctions in the case where a B2 error is detected.
Figure 9:
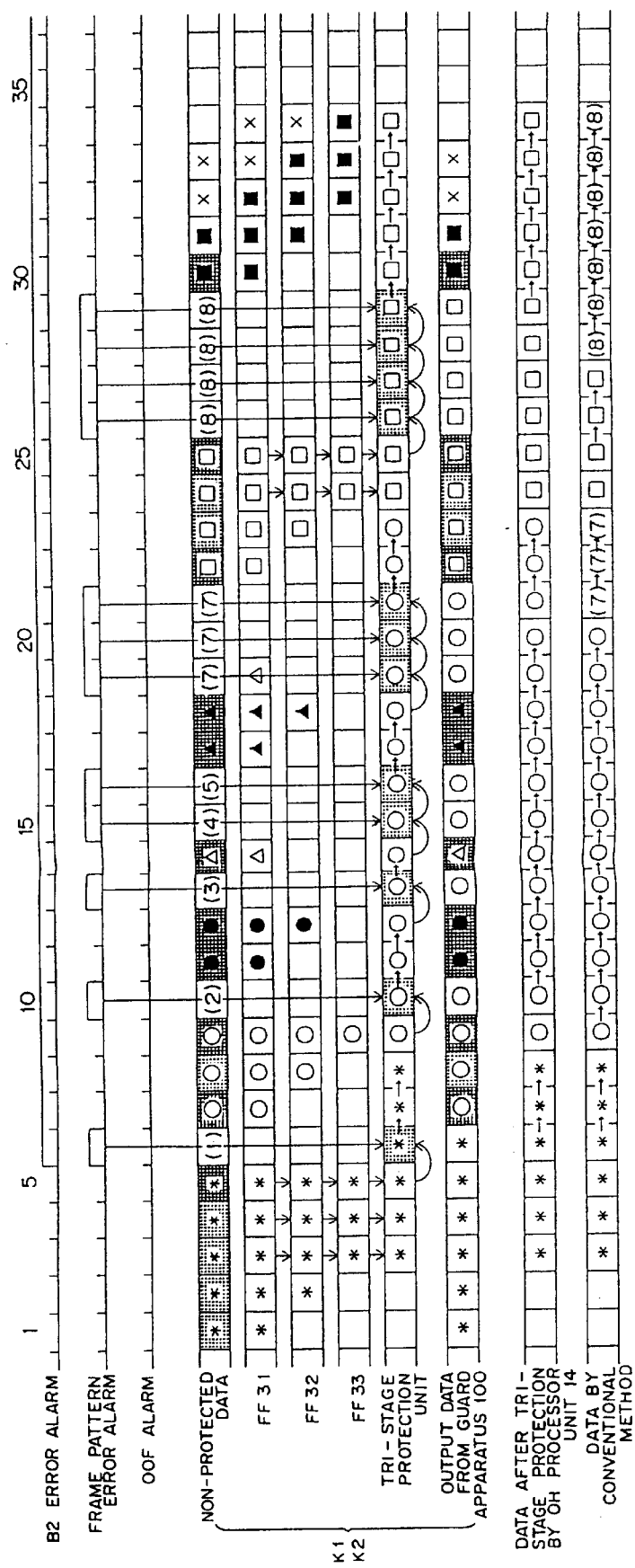
FIG. 9 explains an operation example of a guard apparatus for avoiding malfunctions in the case where a frame pattern error is detected.
Figure 10:
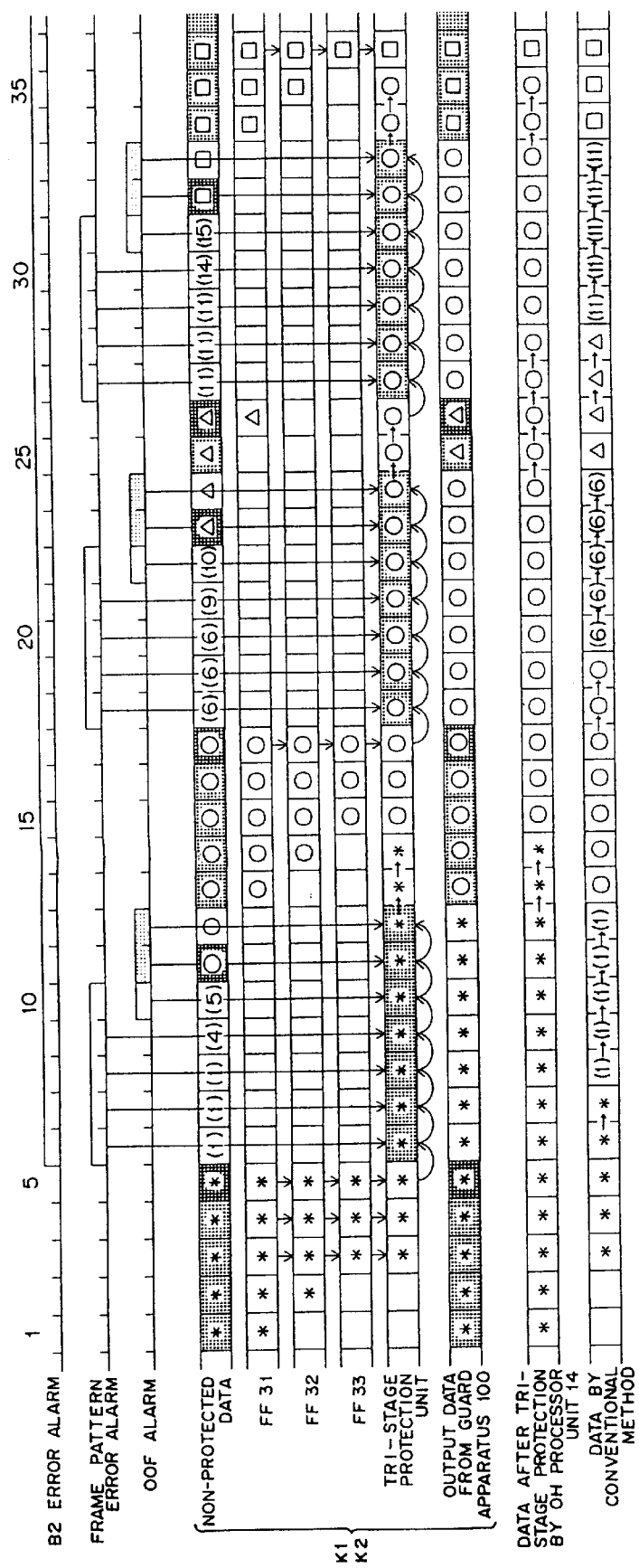
FIG. 10 explains an operation example of a guard apparatus for avoiding malfunctions in the case where both a frame pattern error and an out-of-frame are detected.

FIGS. 8 through 10 explain operation examples of the guard apparatus 100 of this embodiment. FIG. 8 explains an operation example of the guard apparatus 100 against the occurrence of a B2 error. As shown at the top in FIG. 8, an alarm for indicating that a B2 error is detected in the 6th, and 586th frames. It is also indicated that a B2 error alarm is in an alarm cancel time for the 7th through 580th, and 587th and subsequent frames.

This cancel time means that after a B2 error is actually detected and an alarm is issued, the alarm is not cancelled immediately, and the same state as when an error is detected continues even after a B2 error is not detected in a next frame. Only if during this cancel time an error is not detected again, is the alarm cancelled. In the case of a B2 error, this cancel time becomes considerably long compared with the cases of other errors. This is because it takes a long time to detect the error, since only an error at the rate of one or more bits per 1,000 bits is judged to be a B2 error.

In FIG. 8, for the 1st through 5th frames, non-protected data, that is, the data of K1 and K2 bytes, are shifted in succession between FFs 31 through 33, and the output of the tri-stage protection unit 11 becomes data * for the 3rd through 5th frames. Since any error is not detected for the 1st through 5th frames, the selector 12 shown in FIG. 2 selects and outputs non-protected data outputted by the overhead extractor unit 10 as they are, and the output data all become *. The *, ○, *, ●, Δ, ▼, □, ■ shown in FIGS. .8 through 10 indicate the normal values of the data of the K1 and K2 bytes, and (1) through (15) indicate error data.

Since the operation is performed for the 6th through 580th frames when an alarm corresponding to a B2 error is issued or when the alarm is cancelled, the operation is performed assuming that a B2 error is detected. In this case, the operation for tri-stage protection by the tri-stage protection unit 11 in FIG. 2 is stopped, the data latched to the three FFs 31 through 33 are cleared, and the tri-stage protection unit 11 continues to output the output data immediately before the detection of the B2 error, that is, data *. Since the selector 12 selects the output of the tri-stage protection unit 11, the output data of the guard apparatus 100 becomes all data *.

For the 581th through 585th frames the selector 12 selects and outputs non-protected data inputted by the OHP extractor unit 10 as they are, and the output data to the overhead interface 13 become data Δ. Meanwhile, since the B2 error alarm is cancelled, the tri-stage protection unit 11 restarts the operations, and outputs data Δ for the 583th through 585th frames.

Since the operation is performed for the 586th and subsequent frames when a B2 error alarm is issued or when the alarm is cancelled, the operation for tri-stage protection by the tri-stage protection unit 11 is stopped, the output of the data of the K1 and K2 bytes from the guard apparatus 100 remains as the output data Δ for the 585th frame. Since the selector 12 continues to select the output of the tri-stage protection unit 11, the output of the guard apparatus 100 remains data Δ. (1), (2) and (3) of the non-protected data in FIG. 8 indicate data in which an error occurs due to the optical degradation.

In this embodiment, one more steps of the tri-stage protection operation is performed in the OH processor unit 14 inserted after the overhead interface 13 as shown in FIG. 2. The second data from the bottom in FIG. 8 indicate the data (data after the tri-stage protection by the OH processor unit 14), and differ from the output of the guard apparatus 100 only in that data for the 581th and 582th frames change from data Δ to data *.

The data at the bottom in FIG. 8 indicate the output data of the conventional method, that is, in the case where data are not processed by the guard apparatus 100, and only a tri-stage protection in the OH processor unit 14 is performed. In this case, the operation for tri-stage protection is not stopped, even if an error is not detected. For this reason, data (1) in which an error occurs due to an optical degradation are issued as for the 8th through 10th frames shown in FIG. 8. On the other hand, in this embodiment, as shown in FIG. 8, even if data in which an error occurs are linked for three frames, data with an error are never outputted, and thereby the malfunction of a communication apparatus can be avoided.

Since the alarm cancel time of a B2 error is long and the tri-stage protection result before the occurrence of the error continues to be outputted, a stronger guard for an error can be realized compared with the conventional method.

FIG. 9 explains an operation example of the guard apparatus 100 for avoiding malfunctions in the case where both a frame pattern error and a B2 error occur. However, even if a B2 error occurs, a B2 error INH control for nullifying the detection signal is performed through the microcomputer interface 21 shown in FIG. 2. When only a B2 error occurs while this B2 error INH control is being performed, the selector 12 selects non-protected data outputted by the overhead extractor unit 10, and the non-protected data are outputted to the overhead interface 13. The alarm cancel time of a frame pattern error is zero, and as soon as a frame pattern error is not detected, the alarm is immediately cancelled.

In FIG. 9, (1) through (8) of non-protected data indicate data in which an error occurs due to an optical degradation.

Until data (1) in which an error occurs when the operation is performed for the 6th frame and a frame pattern error is detected, in FIG. 9 the same normal data * are outputted as shown in FIG. 8.

When a frame pattern error is detected when the operation is performed for the 6th frame, the data latched to FFs 31 through 33 in the tri-stage protection unit 11 are cleared by a tri-stage protection INH signal, and tri-stage protection unit 11 outputs data * outputted when the operation is performed for the 5th frame.

When the operation is performed for the 7th through 9th frames, since a frame pattern error alarm is cancelled, the tri-stage protection unit 11 restarts the operation for tri-stage protection. However, the output data for the 7th and 8th frames remain data *, and the output data for the 9th frame become data 0. Meanwhile, the selector 12 selects non-protected data inputted from the OH extractor unit 10, and the guard apparatus 100 outputs data 0.

Although during this time a B2 error is detected and a B2 error alarm is issued, the B2 error alarm is nullified, since the guard apparatus 100 is in a state of a B2 error INH as described earlier.

When the operation is performed for the 10th frame, a frame pattern error is detected again, the tri-stage protection unit 11 stops the operation for tri-stage protection when a tri-stage protection INH signal is received, and the output remains data 0. Although the tri-stage protection unit 11 restarts the operation for tri-stage protection, since for the following 11th and 12th frames the frame pattern error is cancelled, the selector 12 selects and outputs not the output from the tri-stage protection unit 11, but non-protected data being the output from the OH extractor unit 10, that is, data ●, and these become the output of the guard apparatus 100.

Since the operations after this for frames of the guard apparatus 100 are the same as described above, the description is omitted.

The second data from the bottom in FIG. 9 are the output result of the tri-stage protection unit in the OH processor unit 14 located after the overhead interface 13. When for the data after the tri-stage protection by the OH processor unit 14, output data for the 7th and 8th frames change to data * and the same data are not outputted in three more frames, the output of an overhead interface 13 when the operation is performed for the previous frame becomes the final output.

Data at the bottom in FIG. 9 is the data output by the conventional method. When, out of data in which an error due to an optical degradation occurs the same data continue for three or more consecutive frames, that is, when the operations is performed for the 21st through 23rd frames or the 28th frame shown in FIG. 9, in the conventional method, (7) or (8) is outputted. On the other hand, in this embodiment no data with an error such as this are outputted. In this embodiment, since a frame pattern error alarm is immediately cancelled, roughly speaking, data with no errors are outputted two frames later than non-protected data.

FIG. 10 explains the third operation example of the guard apparatus for avoiding malfunctions, in which a frame pattern error, an out-of-frame and a B2 error occur. However, in FIG. 10 it is assumed that a control for nullifying the detection result, that is, a B2 error INH operation such as shown in FIG. 9, is Ad performed even if a B2 error is detected.

In FIG. 10, for example, when an out-of-frame is detected for the 9th frame, the cancel time for the out-of-frame is set while the time of the 11th and 12th frames. This cancel time refers to the same cancel time as for a B2 error shown in FIG. 8. However, a cancel time for an out-of-frame is far shorter than a cancel time for a B2 error.

In FIG. 10, since a B2 error INH control is performed, on detecting a frame pattern error, an out-of-frame, and a frame cancel time, the tri-stage protection unit 11 stops the tri-stage protection operation, and selects and outputs the output data outputted immediately before the stop of the tri-stage protection operation, by the section of the selector 35. For this reason, the output data up to frames 12 from the tri-stage protection unit 11 and the guard apparatus 100 become all data *. When the operation is performed for the 13th through 17th frames, non-protected data are selected by the selector 12 and outputted as they are in the case where there is no B2 error, since a B2 error INH control is performed. Since the operations for frames of the guard apparatus 100 after that are the same as described earlier, the description is omitted here.

The second data from the bottom in FIG. 10, that is, the output data of the tri-stage protection unit in the OH processor unit 14, are the same as the output data of the guard apparatus 100, except that output data for the 13th and 14th frames change from data 0 to data *, and that output data for the 25th and 26th frames become data 0 since the output of the guard apparatus 100 of the same data (data Δ) continues only for two frames when the operations is performed for the 25th and 26th frames.

Data at the bottom in FIG. 10 are the data output by the conventional method. In the conventional method, since only a one-stage operation for tri-stage protection performed in the OH processor unit 14 is not stopped, even if an error is detected, (1), (6) and (11) with an error due to an optical degradation are outputted, which cause malfunctions of the communication apparatus.

In the guard apparatus 100 of this embodiment a control from a computer 23 through a microcomputer interface 21 can enable an INH control unit 18 to nullify an arbitrary error detection. Thus, the guard apparatus 100 can change the setting of the guard strength against errors due to an optical degradation, etc. by selecting an error detection from among a B2 error, a frame pattern error and an out-of-frame, as a guard trigger.

The relationship between the settings of the guard trigger and the strength of the guard operation is described below. For the strength of an error level as a guard trigger a B2 error is the weakest, a frame pattern (FP) error is in the middle, and an out-of-frame (OOF) is the strongest. When a weak error level is selected as a guard trigger, the overall strength against a data error of the guard operation becomes great.

A trigger in which the strength of the guard operation is strongest is a B2 error (=a B2 error+an FP error+OOF=a B2 error+an FP error or OOF), one with the second strongest guard operation is an FP error+OOF, one with the third strongest guard operation is an FP error, and one with the weakest guard operation is an OOF.

Figure 11:
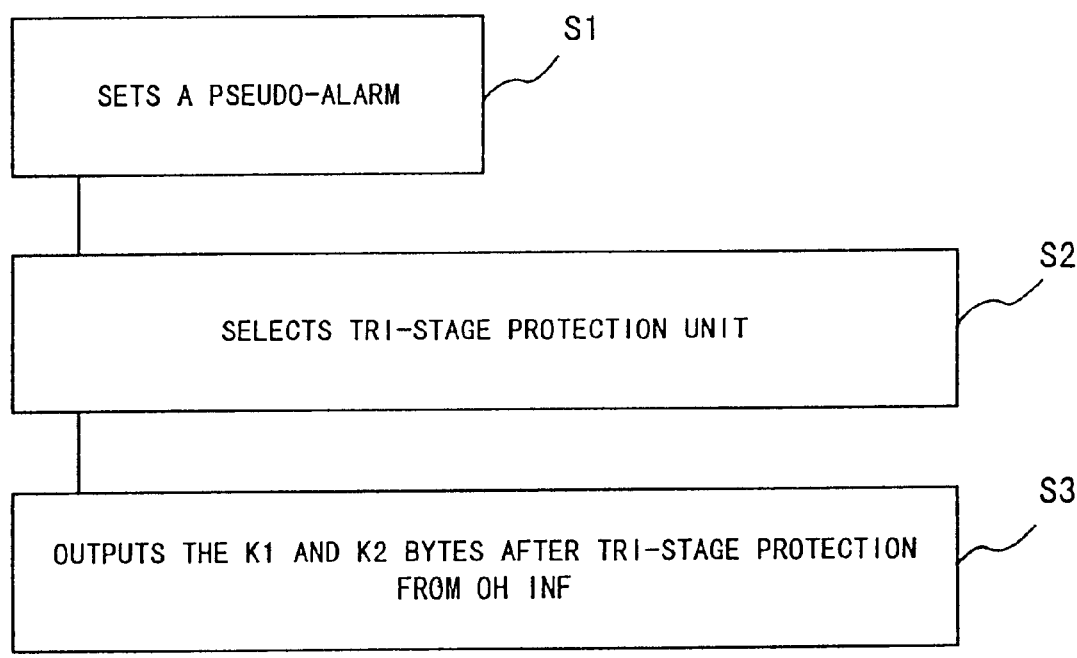
FIG. 11 is a flowchart showing the verification process of a tri-stage protection unit.
Figure 12:
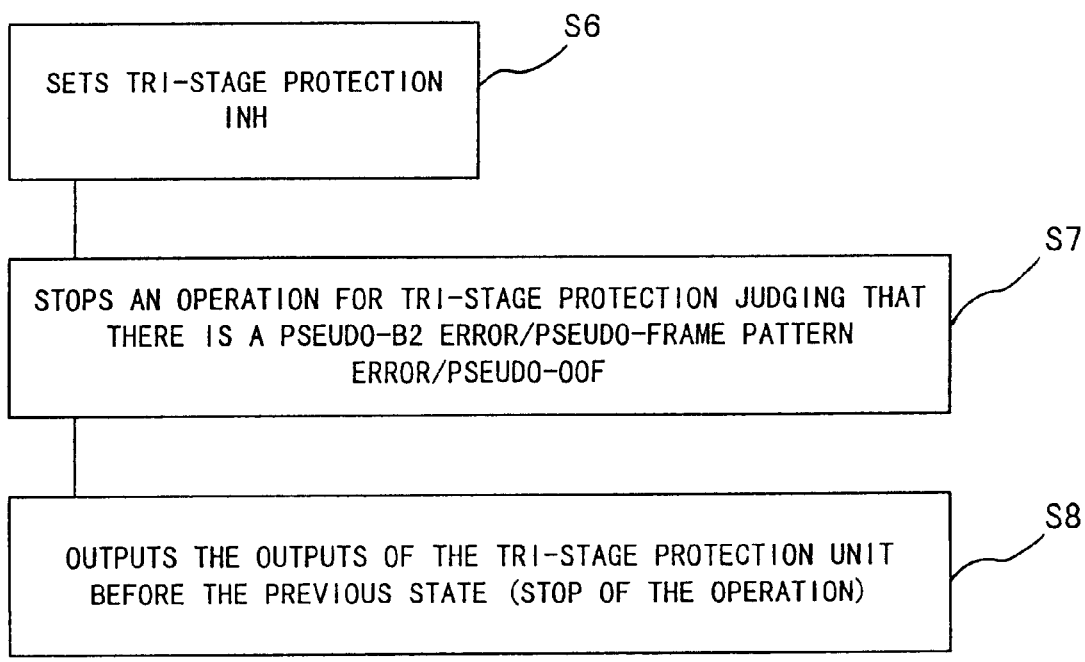
FIG. 12 is a flowchart showing the verification process of tri-stage protection INH control.
Figure 13:
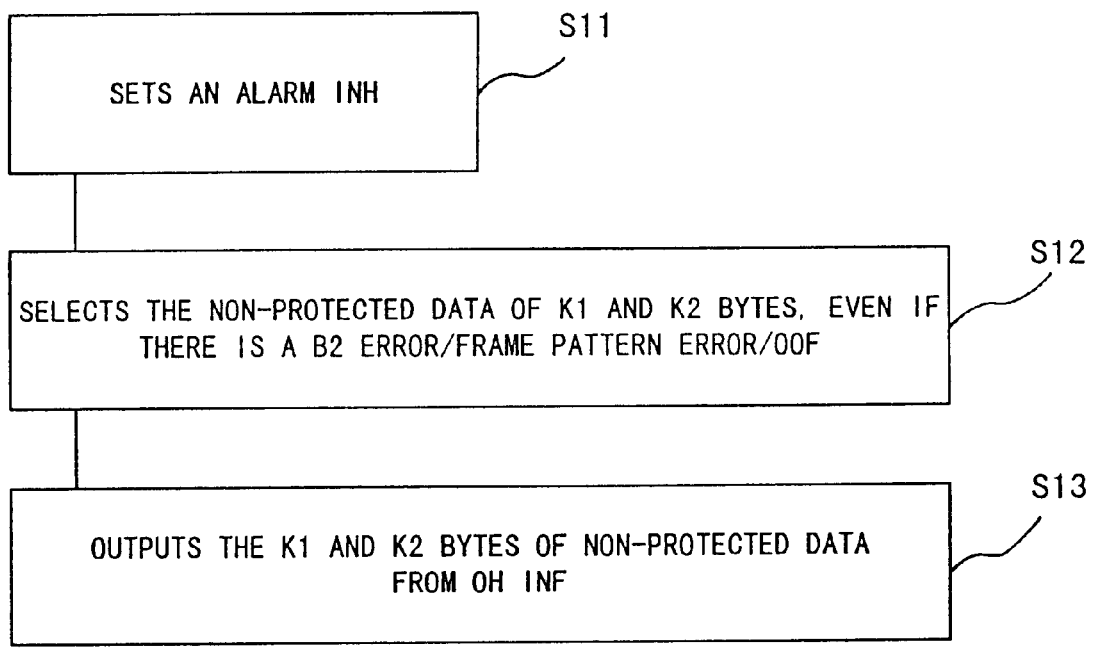
FIG. 13 is a flowchart showing the verification process of alarm INH control.

FIGS. 11 through 13 are flowcharts showing the pseudo-operations such as the verifications of circuit operations, debugging, etc., performed using the microcomputer interface 21 shown in FIG. 2.

FIG. 11 is a flowchart showing the verification process of the tri-stage protection unit. In step S1 shown in FIG. 11 a pseudo-alarm is issued to enable the selector 12 to select the output of the tri-stage protection unit 11, in step S2 the tri-stage protection data are selected corresponding to the pseudo-alarm and in step S3 the K1 and K2 bytes after the tri-stage protection process are outputted from the overhead interface 13. It is verified whether a tri-stage protection is correctly performed by the guard apparatus 100 by comparing the data of the K1 and K2 bytes outputted from this overhead interface 13, the output of a parallel/serial converter unit 22, that is, the non-protected data of the serial output of the K1 and K2 bytes, and the output of a parallel/serial converter unit 24, that is, the serial output after the guard operation.

FIG. 12 is a flowchart showing the verification process of a tri-stage protection INH control. In FIG. 12, in step S6 a tri-stage protection INH is set, and the tri-stage protection unit 11 shown in FIG. 2 is provided with a tri-stage protection INH signal. Then, in step S7, when receiving this tri-stage protection INH signal, the tri-stage protection unit 11 outputs data immediately before the stop of the tri-stage protection operation, judging that one of a pseudo-B2 error, a pseudo-frame pattern error and a pseudo-out-of-frame occurs. In step S8 the output before the stop of the operation in step S7 is selected by the selector 12, and is outputted as the data of the K1 and K2 bytes after the guard operation.

Then, as shown in FIG. 11, it can be verified whether a tri-stage protection INH control is correctly performed by comparing this output and the outputs of the two parallel/serial converters 22 and 24.

FIG. 13 is a flowchart showing the verification process of an alarm INH control for reporting an error detection and nullifying the error detection signal even if there is a B2 error, a frame pattern error or an out-of-frame. In FIG. 13, in step S11 an alarm INH, that is, an alarm for nullifying a signal for reporting the error detection is inputted from the microcomputer interface 21 to the INH control unit 18 shown in FIG. 2. In step S12, even if there is any of these three errors, the selector 12 selects not the output of the tri-stage protection unit 11, but non-protected data outputted by the overhead extractor unit 10. Then, in step S13 the K1 and K2 bytes of the non-protected data are outputted from an overhead interface 18. As described earlier, by comparing this output and the outputs of the two parallel/serial converters 22 and 24, it can be verified that an alarm INH control is correctly performed.

As so far described in detail, according to the present invention, when a predetermined error is detected, a tri-stage protection operation is stopped, and data before the error detection are outputted. Thus, the extraction of data containing an error due to an optical degradation being a cause of malfunctions of a receiving apparatus can be avoided, and thereby the malfunctions of a communication apparatus in an optical communication system can be avoided. Accordingly, the present invention greatly contributes to the improvement of the practicability of an optical communication system.

What is claimed is:

1. A guard apparatus for receiving data in a predetermined location of a frame of data received on the receiving side of an optical communication system and an error detection signal indicating a previously detected error of a predetermined type in said received frame of data, and providing outputs depending upon said received inputs, comprising:

tri-stage protecting means for receiving an INH signal and for comparing data in said predetermined location of three successive frames of data, and outputting data from said predetermined location of a frame of data received one frame prior to a latest received frame of data when, at least one of, said INH signal is active and said compared data does not coincide, otherwise outputting data from said latest received frame of data; and selecting means for receiving said output from said tri-stage protecting means and, if said error detection signal is inputted for said latest received frame, outputting said INH signal to said tri-stage protecting means and selecting the output of the tri-stage protecting means to be output from said selecting means, and, if not, selecting and outputting the data in said predetermined location of said latest received frame.

2. The guard apparatus according to claim 1, wherein said frame is a SONET/SDH frame.

3. The guard apparatus according to claim 2, wherein said data in the predetermined location of said frame is data in the overhead section of said SONET/SDH frame.

4. The guard apparatus according to claim 3, wherein said data in the predetermined location are data of the K1 and K2 bytes of said overhead section.

5. The guard apparatus according to claim 1, wherein said predetermined error is the B2 byte error of a SONET/SDH frame.

6. The guard apparatus according to claim 1, wherein said predetermined error is the frame pattern error of a SONET/SDH frame.

7. The guard apparatus according to claim 1, wherein said predetermined error is an out-of-frame in which the frame pattern error of a SONET/SDH frame is detected in five consecutive frames.

8. The guard apparatus according to claim 1, further comprising:

error condition setting means for providing said selecting means with a pseudo-error detection signal.

9. The guard apparatus according to claim 8, wherein said error condition setting means provides said pseudo-signal according to an instruction from an external computer.

10. The guard apparatus according to claim 1, further comprising:

error detection signal nullifying means for nullifying said error detection signal inputted to said selecting means.

11. The guard apparatus according to claim 10, wherein said error detection signal nullifying means nullifies said error detection signal inputted to said selecting means according to an instruction from an external computer.

12. The guard apparatus according to claim 10, wherein a plurality of said error detection signals corresponding to each of plural kinds of errors are inputted to said selecting means, and said error detection signal nullifying means nullifies an arbitrary combination of error detection signals out of said plurality of error detection signals.

13. The guard apparatus according to claim 12, wherein said plural kinds of errors are a B2 error, a frame pattern error and an out-of-frame.

14. The guard apparatus according to claim 1, further comprising:

second tri-stage protecting means for, if output data outputted by said selecting means and output data outputted by said selecting means one and two data before the output data are all the same, outputting the data, and, if not, outputting the data outputted by said selecting means one data before said output data.

15. A guard method for receiving frames of data received on the receiving side of an optical communication system, detecting errors in said received frames of data, and providing outputs depending upon said received inputs and detected errors, comprising the steps of:

detecting an error of a predetermined type for a received frame of data and when there is no error, outputting the data of the received frame;

comparing data in a predetermined location of three successive frames of data;

storing the data when the compared data coincides, otherwise when the compared data does not coincide storing data stored immediately before as they are;

when an error is detected, outputting the stored data; and repeating said detection of an error of a predetermined type for a next received frame and the processes after that.

16. A guard method for receiving data in a predetermined location of a frame of data received on the receiving side of an optical communication system, detecting errors in said received frame of data, and providing outputs depending upon said received data and detected errors, comprising the steps of:

if an error of a predetermined type for a received frame is detected, selecting and outputting data outputted for a frame received one frame before said received frame; and if not, selecting and outputting data in said predetermined location of said received frame.

17. The guard method according to claim 16, further comprising the step of:

comparing said selected and outputted data for three successive frames of data and if said selected and outputted data are the same three consecutive times, the data are outputted, and if not, data outputted immediately before continues to be outputted.

* * * * *